United States Patent
Chen et al.

(10) Patent No.: US 6,738,512 B1
(45) Date of Patent: May 18, 2004

(54) USING SHAPE SUPPRESSION TO IDENTIFY AREAS OF IMAGES THAT INCLUDE PARTICULAR SHAPES

(75) Inventors: Xiangrong Chen, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 542 days.

(21) Appl. No.: 09/597,456

(22) Filed: Jun. 19, 2000

(51) Int. Cl.[7] .................................................. G06K 9/46

(52) U.S. Cl. ........................ 382/176; 382/200; 382/203
(58) Field of Search ................................ 382/176, 199, 382/200, 203, 253

(56) References Cited

U.S. PATENT DOCUMENTS

| | | | | | |
|---|---|---|---|---|---|
| 4,193,056 A | * | 3/1980 | Morita et al. | ................ | 382/196 |
| 4,817,166 A | * | 3/1989 | Gonzalez et al. | ............ | 382/105 |
| 4,972,499 A | * | 11/1990 | Kurosawa | .................... | 382/227 |
| 6,101,274 A | * | 8/2000 | Pizano et al. | ................ | 382/176 |
| 6,181,806 B1 | * | 1/2001 | Kado et al. | .................. | 382/118 |
| 6,529,635 B1 | * | 3/2003 | Corwin et al. | ............... | 382/243 |

FOREIGN PATENT DOCUMENTS

EP            516576 A2 * 12/1992 ............ G06K/9/20

OTHER PUBLICATIONS

Chun et al. "Automatic Text Extraction in Digital Videos using FFT and Neural Network." Proc. FUZZ–IEEE '99, IEEE Int. Fuzzy Systems Conference, vol. 2, Aug. 1999, pp. 1112–1115.*
Hori. "A Video Text Extraction Method for Character Recognition." Proc. ICDAR '99, 5th Int. Conf. on Document Analysis and Recognition, Sep. 1999, pp. 25–28.*
Quweider et al. "Efficient Classification and Codebook Design for CVQ." IEE Proceedings—Vision, Image and Signal Processing, vol. 143, No. 6, Dec. 1996, pp. 344–352.*
Wu et al. "Finding Text in Images." ACM, DL 97, 1997, pp. 3–12.*
Gargi et al. "Indexing Text Events in Digital Video Databases." Proc. of the 14th Int. Conf. on Pattern Recognition, vol. 1, Aug. 1998, pp. 916–918.*
Shim et al. "Automatic Text Extraction from Video for Content–Based Annotation and Retrieval." Proc. of the 14th Int. Conf. on Pattern Recognition, vol. 1, Aug. 1998, pp. 618–620.*
Jaisimha et al. "Fast Facet Edge Detection in Image Sequences Using Vector Quantization." ICASSP–92, IEEE Int. Conf. on Acoustics, Speech and Signal Processing, vol. 3, Mar. 1992, pp. 441–444.*
Paglieroni et al. "The Position–Orientation Masking Approach to Parametric Search for Template Matching." IEEE Trans. on Pattern Analysis and Machine Intelligence, vol. 16, No. 7, Jul. 1994, pp. 740–747.*
Lienhart. "Automatic Text Recognition for Video Indexing." ACM Multimedia 96, 1996, pp. 11–20.*

(List continued on next page.)

*Primary Examiner*—Jon Chang
(74) *Attorney, Agent, or Firm*—Lee & Hayes, PLLC

(57) ABSTRACT

Shape suppression is used to identify areas of images that include particular shapes. According to one embodiment, a Vector Quantization (VQ)-based shape classifier is designed to identify the vertical edges of a set of shapes (e.g., English letters and numbers). A shape suppression filter is applied to the candidate areas, which are identified from a vertical edge map according to the edge density, to remove the vertical edges which are not classified as characteristic of shapes. Areas with high enough edge density after the filtering are identified as potential areas of the image that include one or more of the set of shapes.

61 Claims, 12 Drawing Sheets

OTHER PUBLICATIONS

Yang et al. "New Classified Vector Quantization with Quadtree Segmentation for Image Coding." $3^{rd}$ Int. Conf. on Signal Processing, vol. 2, Oct. 1996, pp. 1051–1054.*

Zhong, et al.; "Automatic caption localizaton in compressed video"; International Conference on Image Processing (ICIP'99); vol. 2; pp. 96–100, 1999; Oct. 24–28, 1999.

Zhong, et al.; "Automatic Caption Localization in Compressed Video"; IEEE Transactions on Pattern Analysis and Machine Intelligence, vol. 22; No. 4; Apr. 2000; pp. 385–392.

Huiping Li e al., *Automatic Text Detection and Tracking in Digital Videos*, 40 pages, 1998.

Toshio Sato et al, *Video OCR for Digital News Archives*, IEEE international workshop on content–based access of image and video databases (CAIVD 1998), 9 pages.

Toshio Sato et al, *Video OCR: Indexing Digital News Libraries by Recognition of Superimposed Captions*, ACM Multimedia Systems Special Issue on Video Libraries, 12 pages, Feb. 1998.

Kah–Kay Sung et al, *Example–based Learning for View-based Human Face Detection*, Massachusetts Institute of Technology, 21 pages, 1994.

* cited by examiner outdoor assistants
ZAKARIA OMAR
K MALLIKA computer graphics
LEE TIAN SOON titles

*Fig. 4*

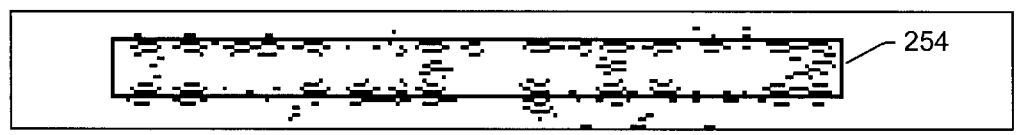
(a)
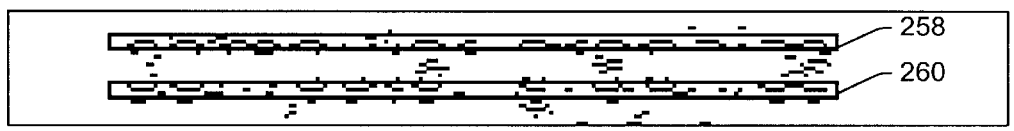
(b)
(c)
Fig. 10

A
(a)
(b)
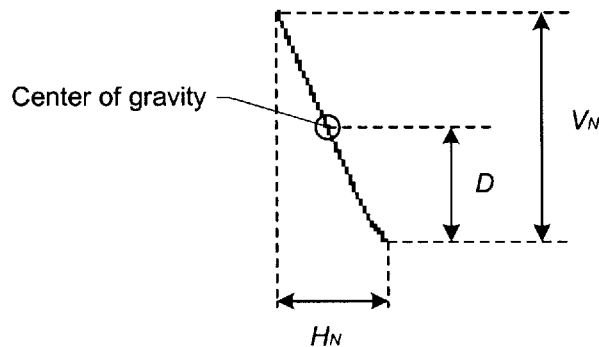
(c)
*Fig. 13*

USING SHAPE SUPPRESSION TO IDENTIFY AREAS OF IMAGES THAT INCLUDE PARTICULAR SHAPES

TECHNICAL FIELD

This invention relates to optical character recognition generally, and more particularly to using shape suppression to identify areas in images that include particular shapes.

BACKGROUND OF THE INVENTION

Computer technology is continually advancing, providing computers with continually increasing capabilities. General-purpose multimedia personal computers (PCs) have now become commonplace, providing a broad range of functionality to their users, including the ability to manipulate visual images. Further advances are being made in more specialized computing devices, such as set-top boxes (STBs) that operate in conjunction with a traditional television and make specialized computer-type functionality available to the users (such as accessing the Internet).

Many such general-purpose and specialized computing devices allow for the display of visual images with text. Given the additional abilities of such devices in comparison to conventional televisions, many situations arise where it would be beneficial to be able to identify the text within a particular visual image. For example, a video image may include a Uniform Resource Locator (URL) identifying a particular web page that can be accessed via the Internet. If the URL text could be identified, then the text could be input to a web browser and the corresponding web page accessed without requiring manual input of the URL by the user.

Identification of text or characters is typically referred to as Optical Character Recognition (OCR). Various techniques are known for performing OCR. However, many OCR techniques require, or their accuracy can be improved by, identifying specific areas within a visual image that contain text prior to application of the OCR technique (that is, only the specific areas that might contain text are input to the OCR process). The accuracy of current techniques for identifying such specific areas is poor, often due to the nature of the underlying video images. Text can be "on top" of a wide range of different backgrounds and textures of the underlying video image. Distinguishing such background from text can be very difficult.

The invention described below addresses these disadvantages, providing text frame detection in video images using shape suppression.

SUMMARY OF THE INVENTION

The use of shape suppression to identify areas of images that include particular shapes is described herein. Such shapes can be, for example, letters, numbers, punctuation marks, or other symbols in any of a wide variety of languages.

According to one embodiment, a set of shape characteristics that identify the vertical edges of a set of shapes (e.g., English letters and numbers) is maintained. The vertical edges in the image are analyzed and compared to the set of shape characteristics using a Vector Quantization (VQ)-based shape classifier. Areas in which these edges match any of the shape characteristics are identified as potential areas of the image that include one or more of the set of shapes.

According to another embodiment, a vertical differential filter is applied to a received image to generate a horizontal edge map, and a non-maxima suppression filter is applied to the horizontal edge map to generate a thinned horizontal edge map. Similarly, a horizontal differential filter is applied to the received image to generate a vertical edge map and is applied to the vertical edge map to generate a thinned vertical edge map. A segmentation process then determines a set of areas that are candidates for including particular shapes (e.g., text) based on the density of edges in the areas of the vertical edge map. The portions of the horizontal edge map corresponding to the candidate areas are then analyzed to determine whether there are a sufficient number of horizontal edges in verification windows of the candidate areas. If there are a sufficient number of horizontal edges in the verification window of a candidate area, then that candidate area is output to a shape suppression filter. The vertical edges in the candidate areas are then compared to a set of shape characteristics by using a VQ-based shape classifier. For each vertical edge, if it is classified as a shape, then the edge is kept; otherwise the edge is removed. Based on the remaining edges, the probable areas are then selected and output as shape (e.g., text) areas.

BRIEF DESCRIPTION OF THE DRAWINGS

The present invention is illustrated by way of example and not limitation in the figures of the accompanying drawings. The same numbers are used throughout the figures to reference like components and/or features.

FIGS. 4 and 5 illustrate an example video images including text.

FIGS. 10(a), 10(b), and 10(c) illustrate an exemplary horizontal alignment process.

FIGS. 13(a), 13(b), and 13(c) illustrate an example of feature selection of a VQ-based shape classifier.

DETAILED DESCRIPTION

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Alternatively, the invention can be implemented in hardware or a combination of hardware, software, and/or firmware. For example, the invention can be implemented using one or more application specific integrated circuits (ASICs).

Figure 1:
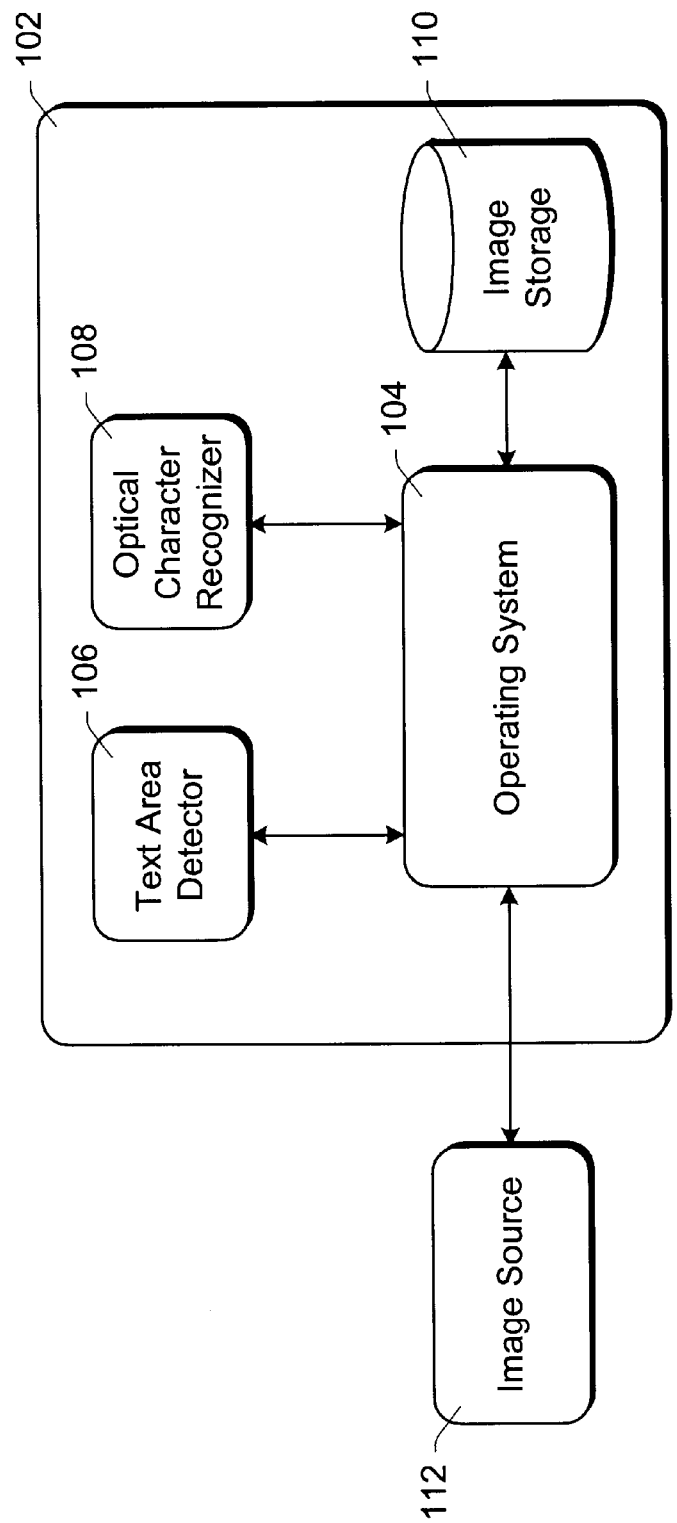
FIG. 1 is a block diagram illustrating an exemplary system to detect text frames in images.

FIG. 1 is a block diagram illustrating an exemplary system to detect text frames in images. A system 102 is illustrated including an operating system 104, a text area detector 106, and an optical character recognizer 108. System 102 represents any of a wide variety of computing devices, including set-top boxes, gaming consoles, personal computers, etc.

Operating system 104 is any of a wide variety of specialized or general purpose operating systems, such as any of the "WINDOWS" family of operating systems (e.g., Windows® 98, Windows® 2000, Windows® CE, etc.) available from Microsoft Corporation of Redmond, Wash. Text area detector 106 detects frames or areas of text within images. The manner in which such frames or areas of text are detected is described in more detail below. Optical character recognizer 108 represents any of a wide variety of conventional components for performing Optical Character Recognition (OCR). The frames or areas of text detected by detector 106 are input to recognizer 108 either directly or via operating system 104.

Although illustrated as separate components, detector 106 and recognizer 108 may be implemented as parts of a single program. Additionally, part or all of the functionality of detector 106 and/or recognizer 108 may be incorporated into operating system 104.

System 102 also includes an image storage device 110. Image storage device 110 provides local storage for images at system 102. Images are received at system 102 from an image source 112. Image source 112 represents any of a wide variety of sources of video images, including video broadcasts (e.g., analog or digital television broadcasts, video streaming via the Internet, etc.), databases (either local or remote) of motion or still images, image capture devices such as cameras or scanners, etc.

Figure 2:
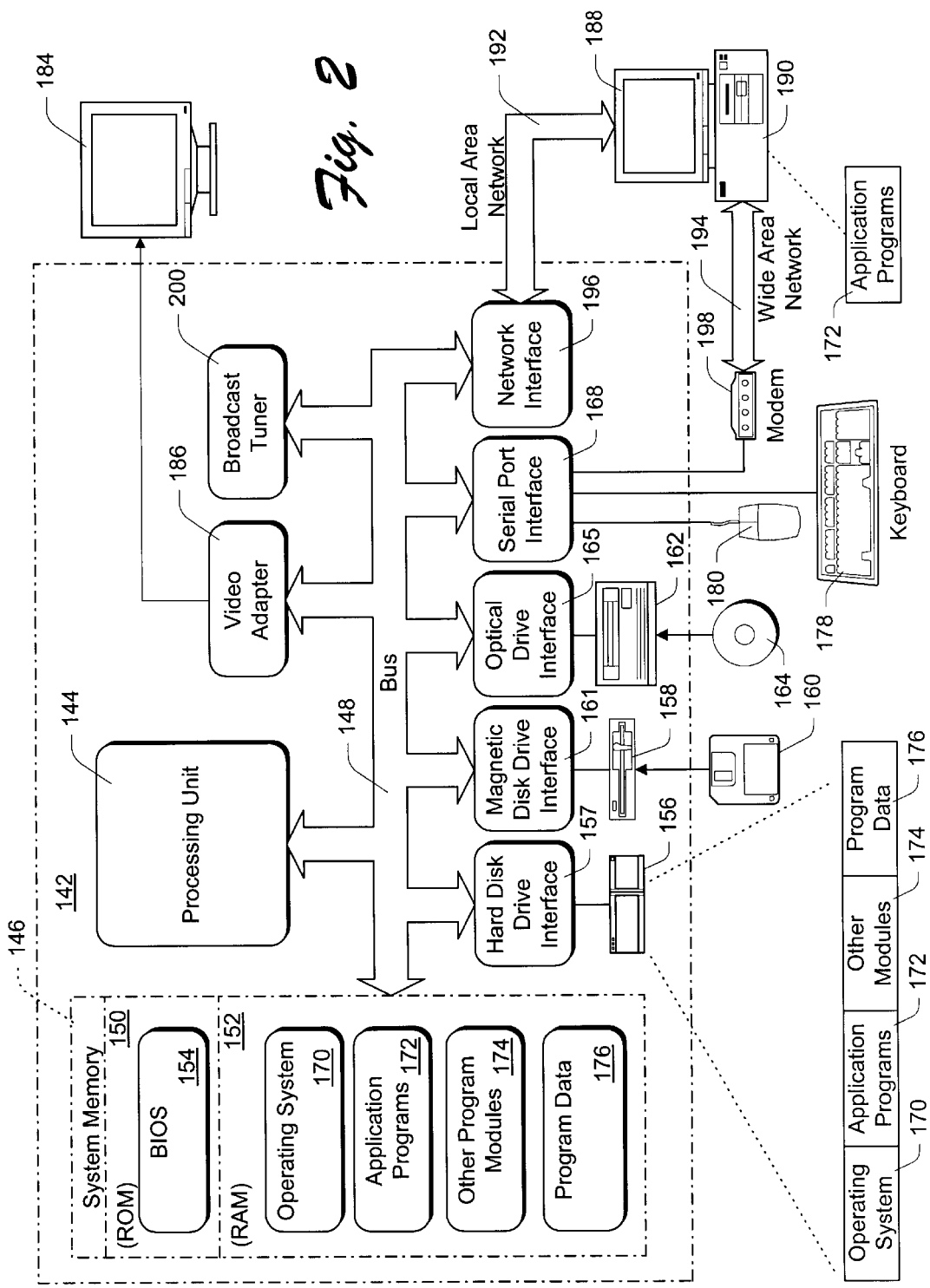
FIG. 2 shows a general example of a computer that can be used in accordance with the invention.

FIG. 2 shows a general example of a computer 142 that can be used in accordance with the invention. Computer 142 is shown as an example of a computer that can perform the functions of system 102 of FIG. 1. Computer 142 includes one or more processors or processing units 144, a system memory 146, and a bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 182 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 can optionally operate in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Computer 142 can also optionally include one or more broadcast tuners 200. Broadcast tuner 200 receives broadcast signals either directly (e.g., analog or digital cable transmissions fed directly into tuner 200) or via a reception device (e.g., via an antenna or satellite dish (not shown)).

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
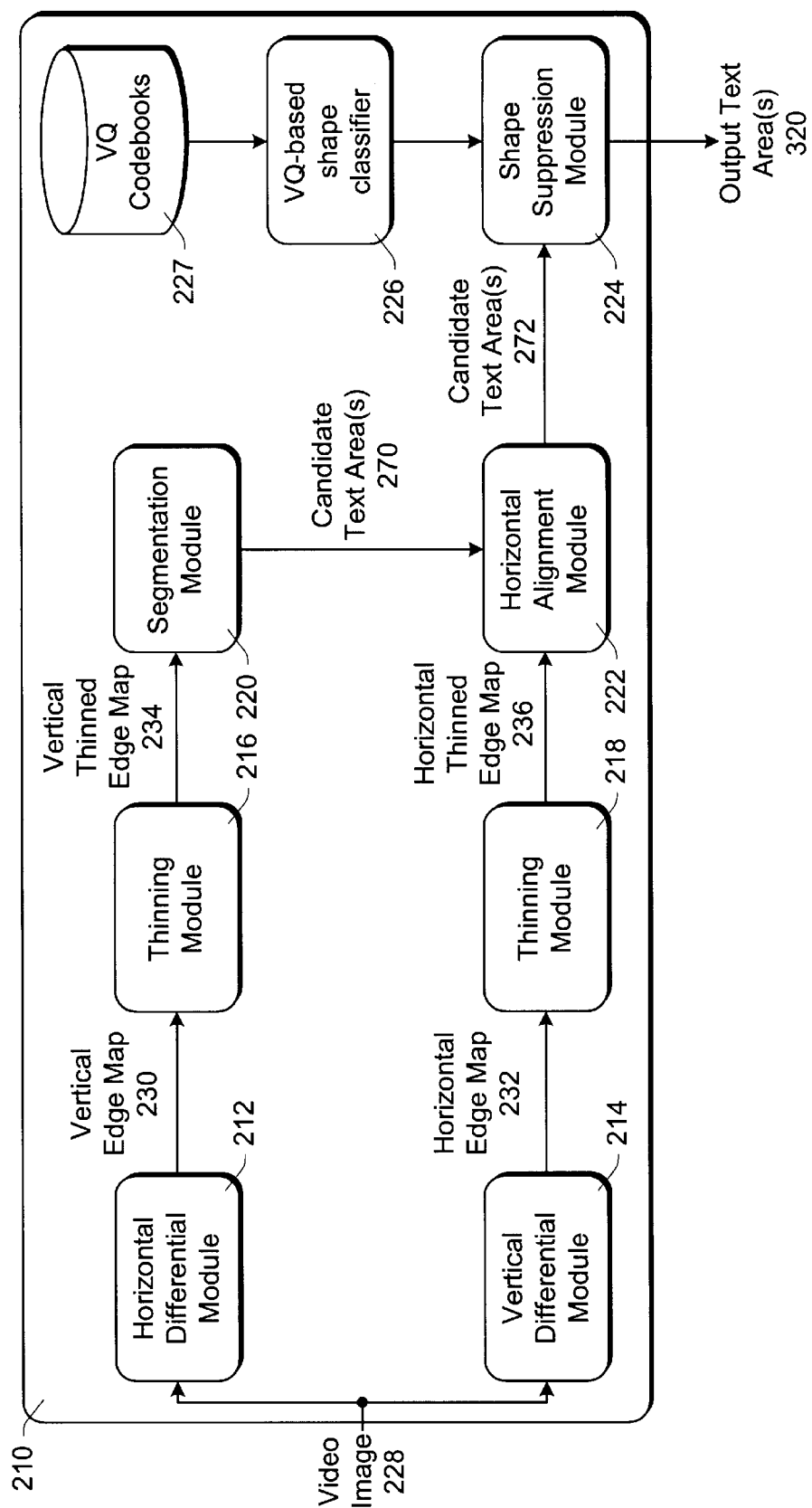
FIG. 3 is an exemplary block diagram illustrating the identification of text areas according to one embodiment of the invention.

FIG. 3 is an exemplary block diagram illustrating the identification of text areas according to one embodiment of the invention. A text area detection system 210 is illustrated including a horizontal differential module 212, a vertical differential module 214, thinning modules 216 and 218, a segmentation module 220, a horizontal alignment module 222, a shape suppression module 224, a Vector Quantization (VQ)-based shape classifier 226, and VQ codebooks 227. In the illustrated example, text area detection system 210 is text area detector 106 of FIG. 1. FIG. 3 is discussed with additional reference to FIGS. 4–15.

System 210 can be used to detect areas that include any of a wide variety of shapes. Examples of such shapes include letters, numbers, symbols, punctuation marks, icons, ideograms, etc., as well as any combination thereof. However, for ease of discussion system 210 is discussed herein with reference to text and text area detection.

A video image 228 is input to text area detection system 210 from any of a wide variety of sources (e.g., image source 112 or image storage 110 of FIG. 1). Video image 228 is received by horizontal differential module 212 and vertical differential module 214. Horizontal differential module 212 is a conventional filter that generates a vertical edge map 230 corresponding to video image 228. "Edges" refer to boundaries between two or more objects in an image. Images can include any of a variety of objects, including letters, numbers, symbols, people, trees, houses, cars, etc. Objects can be "embedded" in one another, such as eyes in a face (the eyes and the face can all be objects), a window in a house, lettering superimposed on another object (such as a car), etc. The identification of edges is well-known to those skilled in the image processing arts, and thus will not be discussed further except as it pertains to the present invention.

Vertical edge map 230 identifies the vertical edges in video image 228 without regard for what those vertical edges are part of. For example, textual characters within video image 228 will typically include vertical edges, but so too will many other objects in image 228 (such as houses, trees, people, etc.).

Similarly, vertical differential module 214 is a conventional filter that generates a horizontal edge map 232 corresponding to video image 228. Horizontal edge map 232 identifies the horizontal edges in video image 228 without regard for what those horizontal edges are part of.

Edge segments in vertical edge map 230 and horizontal edge map 232 are not necessarily vertical or horizontal. The value of each pixel in map 230 (or 232) represents the vertical (or horizontal) projection of the edge strength at that pixel in the video image 228. For ease of explanation, these are referred to herein as vertical (or horizontal) edges.

In the illustrated example, horizontal differential module 212 and vertical differential module 214 are implemented as a Sobel filter. Different parameters or kernels are used by the Sobel filter for generation of a horizontal edge map and a vertical edge map. Sobel filters and their uses are well known in the art and thus will not be discussed further except as the pertain to the invention. Alternatively, other filters may be used, such as a Prewitt filter or a Kirsch filter.

Although illustrated as two separate modules, horizontal differential module 212 and vertical differential module 214 may be the same module capable of simultaneously (or alternatively sequentially) generating edge maps 230 and 232. For example, the same Sobel filter may be used with different parameters or kernels to generate the two edge maps 230 and 232.

Vertical edge map 230 is input to thinning module 216, while horizontal edge map 232 is input to thinning module 218. Thinning modules 216 and 218 may be two separate modules as illustrated, or alternatively may be the same module that simultaneously or sequentially generates vertical thinned edge map 234 and horizontal thinned edge map 236. Thinning modules 216 and 218 reduce the "width" of the edges in vertical edge map 230 (reduce the edges in the direction perpendicular to the edge—horizontal edges are reduced in the vertical direction and vertical edges are reduced in the horizontal direction). In one implementation, thinning modules 216 and 218 reduce the width of the edges to one pixel.

Thinning modules 216 and 218 use a conventional non-maxima suppression method to generate thinned edge maps 234 and 236. Non-maxima suppression techniques are well known in the art and thus will not be discussed further.

Figure 5:
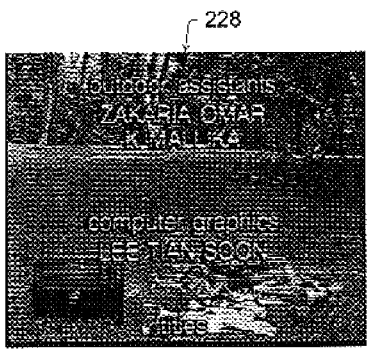
Figure 6:
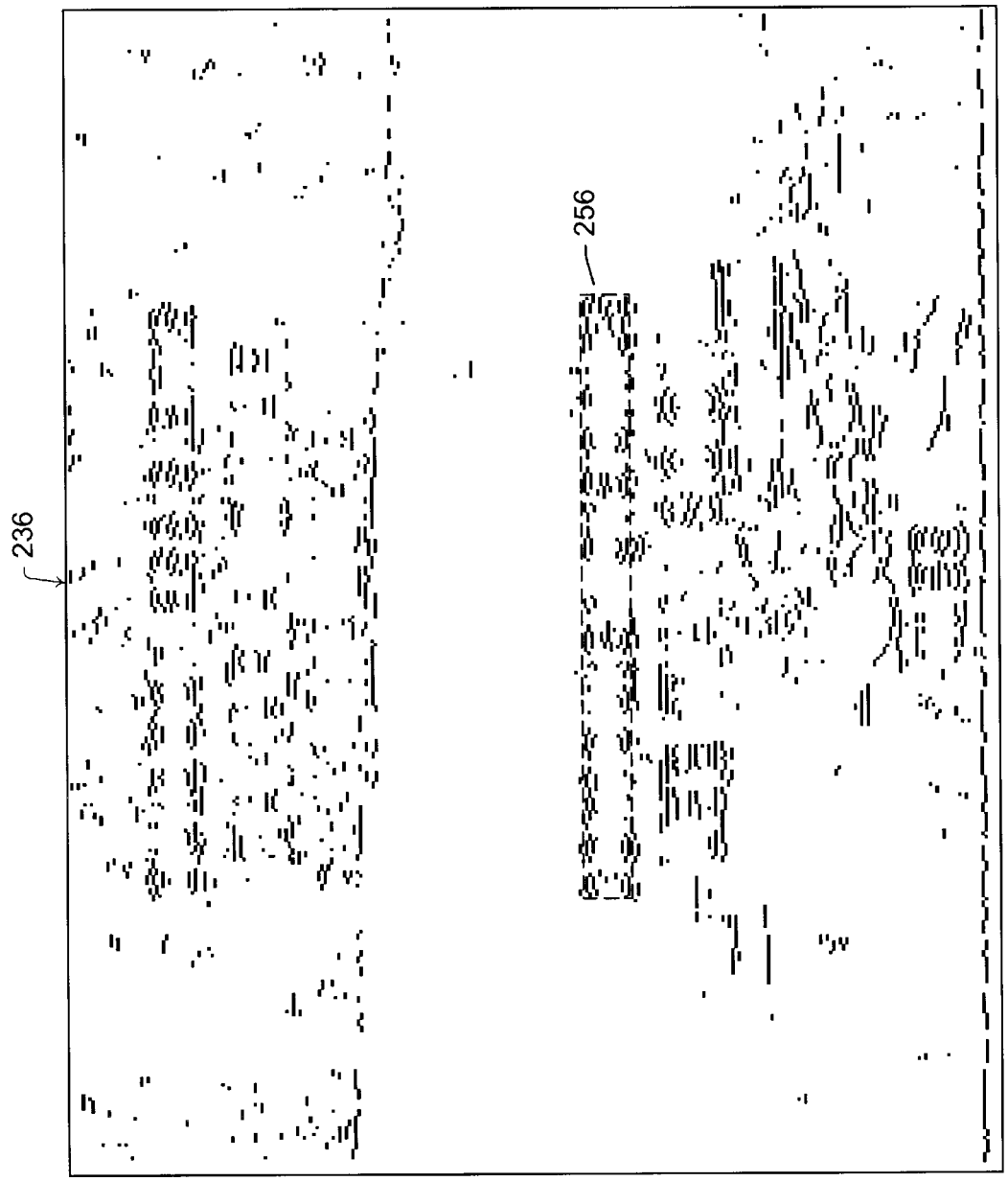
FIG. 6 illustrates an example horizontal thinned edge map.
Figure 7:
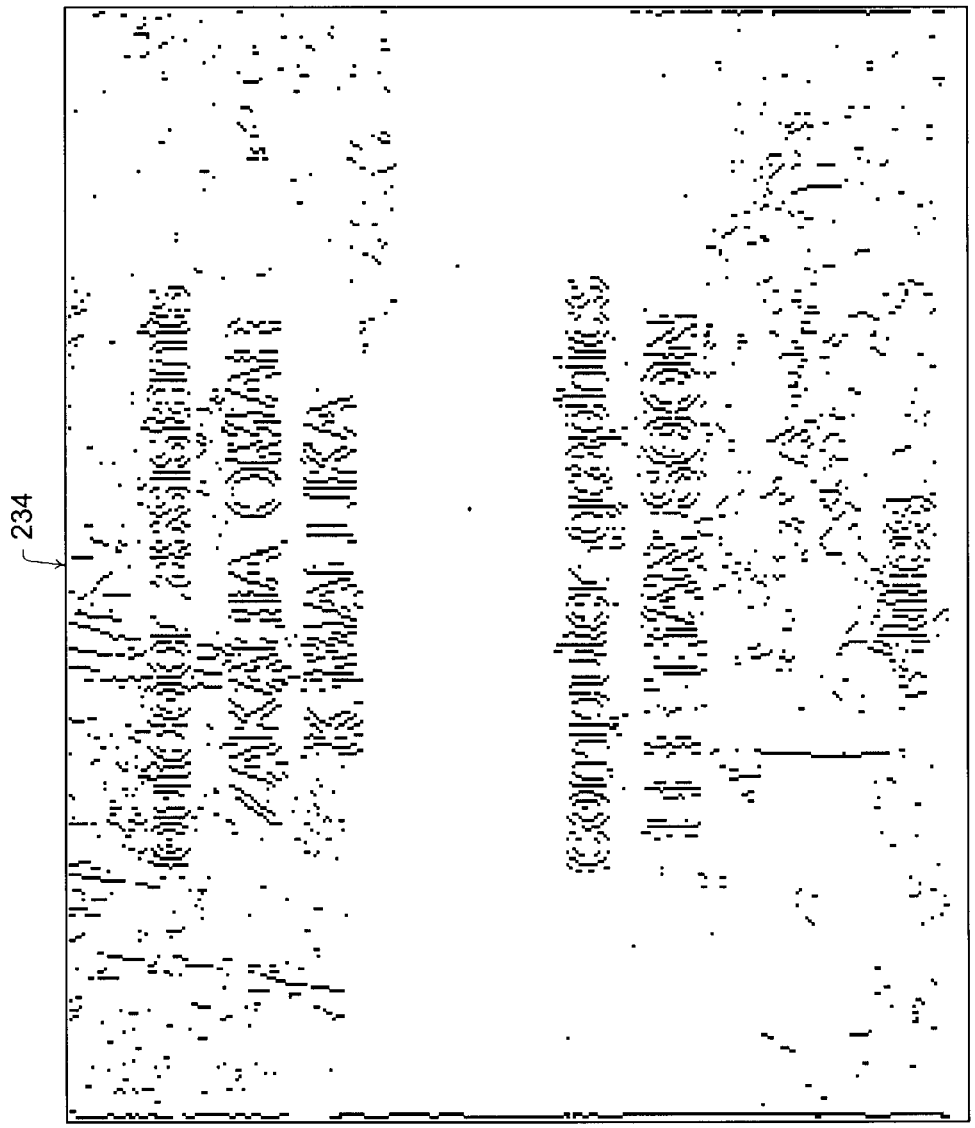
FIG. 7 illustrates an example vertical thinned edge map.
Figure 8:
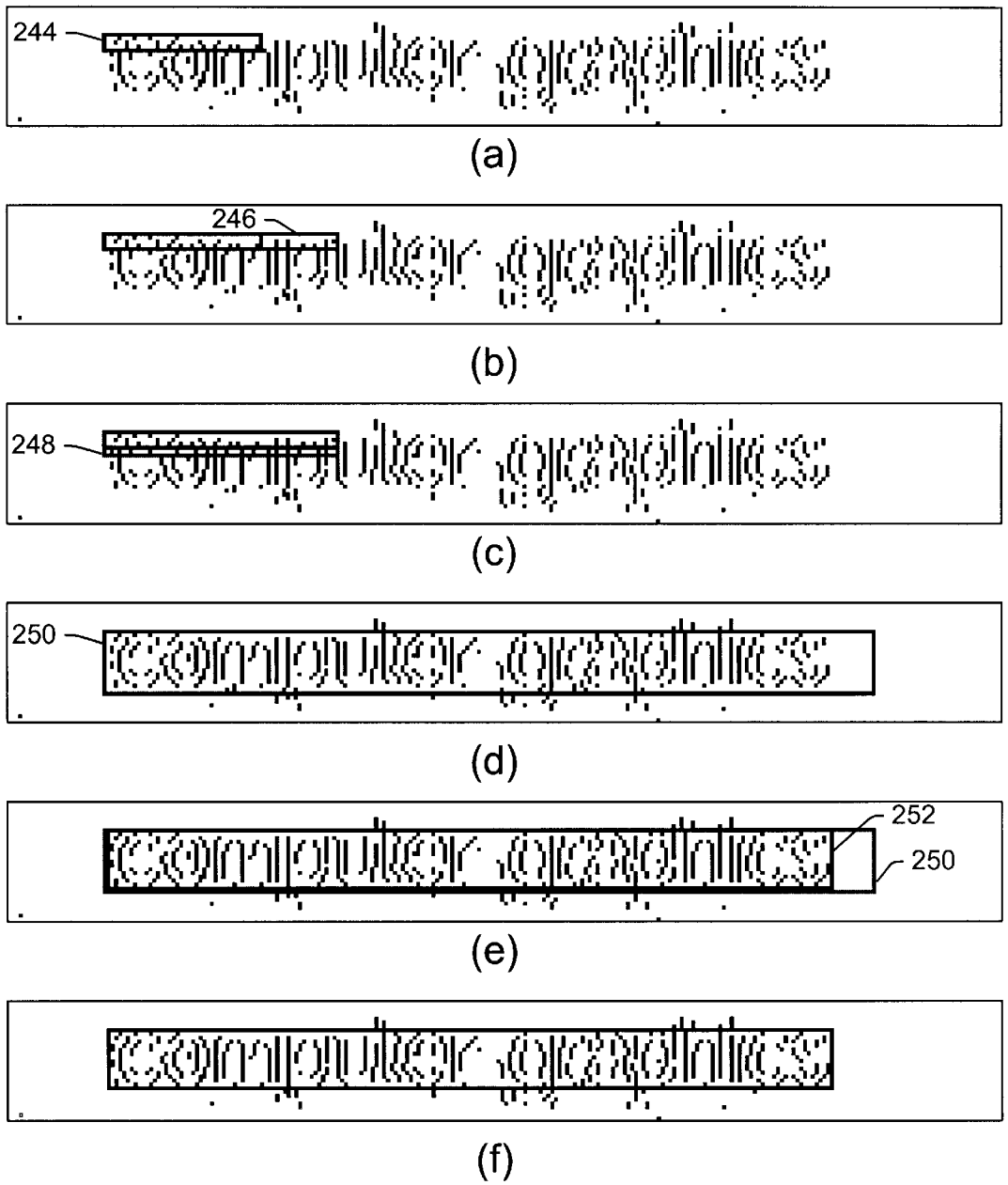
FIGS. 8(a), 8(b), 8(c), 8(d), 8(e), and 8(f) illustrate an example of window processing performed by a segmentation module.

FIG. 4 illustrates an exemplary video image 228 including text as well as background lines 240. FIG. 5 illustrates another example video image 228, including a park scene (trees, grassland, etc.) and some text (credit lines). FIG. 6 illustrates an example horizontal thinned edge map 236 corresponding to an exemplary video image 228 (e.g., image 228 of FIG. 5). Horizontal thinned edge map 236 includes the horizontal edges from video image 228, including edges from the park scene as well as from the text. FIG. 7 illustrates an example vertical thinned edge map 234 corresponding to an exemplary video image 228 (e.g., image 228 of FIG. 5). Vertical thinned edge map 234 includes the vertical edges from video image 228, including edges from the park scene as well as from the text.

Returning to FIG. 3, vertical thinned edge map 234 is input to segmentation module 220. Segmentation module 220 identifies the density of vertical edges in windows of vertical thinned edge map 234, which are rectangular portions of vertical thinned edge map 234, and produces candidate text area(s) 270 based on window growing and shrinking processes as discussed below. In one implementation, segmentation module 220 outputs a selected edge map which includes only the vertical edges that are included in the candidate text area(s). Segmentation module 220 analyzes each window in vertical thinned edge map 234 (except for those windows that are already included in another window as part of a window growing process, or excluded from being part of a window as part of a window shrinking process).

The vertical edge density of a window is calculated by counting the number of edge pixels in the "window" portions of the vertical thinned edge map 234. The number of edge pixels is then compared to a threshold value. If the number exceeds the threshold value, then the window is labeled as potential text, whereas if the number of edge pixels does not exceed the threshold value then the window is labeled as non-text. In one implementation, video image 228 is normalized to a 320×240 pixel image prior to the analysis performed by modules 212 and 214, the window portions used by segmentation module 220 are non-overlapping windows 40 pixels wide by 3 pixels high, and the threshold value is empirically set as 21.

When a potential text window is obtained, segmentation module 220 performs a window-growing process to generate a candidate text area. The window-growing process enlarges the potential text window in the horizontal and vertical direction recursively, based on vertical edge density. In the implementation mentioned above, the increase of the window size is 20 pixels in the horizontal direction and 2 pixels in the vertical direction. The vertical edge density of the add-on area should be greater than the threshold for looking for potential text windows, that is, 21/(40*3).

FIGS. 8(a)–8(f) illustrate an example of window growing and shrinking (discussed in more detail below) processes performed by segmentation module 220 in accordance with certain embodiments of the invention. For ease of explanation, the windowing has been illustrated for only part of vertical thinned edge map 234 (the portion including the vertical edges corresponding to "computer graphics" of FIG. 5). As illustrated in FIG. 8(a), a potential text window 244 is identified. FIG. 8(b) shows a horizontal growing of the window (by the amount of add-on window 246), while FIG. 8(c) shows a vertical growing of the window (by the amount of add-on window 248). The horizontal and vertical growing can occur separately (e.g., first horizontal growing, then vertical growing) or alternatively together (e.g., expand in the horizontal and vertical directions concurrently). The horizontal and vertical window growing continues in each direction individually until the number of edge pixels in the add-on portion no longer exceeds the threshold value. FIG. 8(d) illustrates the result after the window growing process, which is window 250.

If the horizontal and vertical window growing is performed separately, then situations can arise where the window growing process results in a non-rectangular window. In such situations, additional portions are added to the window until it becomes rectangular (even though some of these portions may not satisfy the edge threshold requirement).

Following the window-growing process, a window-shrinking process is used to discard the window margin if it has a low vertical edge density. The window-shrinking process is applied to the window in both the horizontal and vertical directions with the same threshold mentioned above (e.g., 21/(40*3)). The shrinking process is performed recursively, each time decreasing the window size by one pixel in the horizontal and/or vertical direction. The horizontal and vertical shrinking can occur separately (e.g., first horizontal shrinking, then vertical shrinking) or alternatively together (e.g., reduce in the horizontal and vertical directions concurrently). FIG. 8(e) shows the window-shrinking process, with the window 250 being reduced to the size of window 252.

Figure 9:
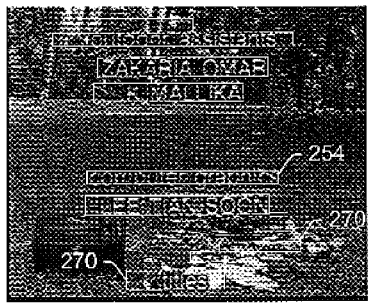
FIG. 9 illustrates an example of output candidate text areas based on the edge map of FIG. 7.

After the window-shrinking option, a candidate text area is identified. FIG. 8(f) shows the obtained candidate text area identified by segmentation module 220. Then segmentation module 220 performs the same processes on remaining regions of the vertical thinned edge map 234. When the entire vertical thinned edge map 234 is processed, the candidate text area(s) 270 is obtained. FIG. 9 illustrates exemplary output candidate text areas 270 based on the input edge map 234 of FIG. 7 derived from video image 228 of FIG. 5.

Returning to FIG. 3, the candidate text area(s) 270 and the horizontal thinned edge map 236 are input to horizontal alignment module 222, which performs verification and horizontal localization on the candidate text area(s) 270 and then outputs candidate text area(s) 272.

In detail, for each candidate text area in 270, the corresponding area of horizontal thinned edge map 236 is analyzed by horizontal alignment module 222. FIG. 10 illustrates the process of horizontal alignment module 222 following the example illustrated in FIGS. 8(a)–8(f). For ease of explanation, the analysis has been illustrated for only one of candidate text areas 270, text area 254, which corresponds to area 256 of horizontal thinned edge map 236 of FIG. 6 (the portion including the horizontal edges corresponding to "computer graphics" of FIG. 5) and is illustrated in FIG. 10(a). Horizontal localization module 222 generates two verification windows, each being as wide as area 254 and three pixels high. In the below description, each "line" represents an area with the same width as area 254 and one pixel in height. One verification window (illustrated as verification window 258 in FIG. 10(b)) covers the two upper most lines of area 254 and one line upon it (that is, the top line of area 254 is the same as the top line of window 258), while the other verification window (illustrated as verification window 260 of FIG. 10(b)) covers the two lower most lines of area 254 and one line under it (that is, the bottom line of area 254 is the same as the bottom line of window 260).

Analogous to the vertical edge density of discussed in segmentation module 220, the horizontal thinned edge density of a verification window is calculated by counting the number of edge pixels in the window portion. The density of each verification window 258 and 260 is compared to a threshold value. In one implementation, this threshold value is the number of pixels in the window (e.g., the width of area 258 or 260 times three) divided by ten. Alternatively, other threshold values could be used. If either of the two densities is lower than the threshold, then the area 254 is discarded from the candidate text area(s) 270.

Figure 11:
FIG. 11 illustrates exemplary candidate text areas of the video image of FIG. 5.

Otherwise, the upper and lower borders of area 254 are modified (possibly) based on the maximum density lines of the two verification windows 258 and 260. The upper border of area 254 is changed (if necessary) to be the line of verification window 258 having the highest horizontal edge density of window 258. Similarly, the lower border of area 254 is changed (if necessary) to be the line of verification window 260 having the highest horizontal edge density of window 260. FIG. 10(c) shows the resultant area 262 after adjusting the upper and lower boundaries. The resultant area (regardless of whether the borders are changed) is output by horizontal alignment module 222 as one of the candidate text area(s) 272. FIG. 11 illustrates exemplary output candidate text areas 272 based on the horizontal and vertical thinned edge maps 234 and 236 derived from video image 228 of FIG. 5.

After the above process, there still remain two types of potential problems arising from non-text textures in the video image: (1) false candidates, and (2) inaccurate left and right text area boundaries. These problems may increase the burden of the OCR procedures following the text area detection. Therefore, it is desirable to do some preprocessing to remove or at least reduce these problems. For this preprocessing, a shape suppression process based on Bayesian decision theory is applied. The basic idea of shape suppression is to use shape information of character edges to reduce the effect of non-text texture. The probabilistic models used for the Bayesian approach are estimated within a Vector Quantization (VQ) framework.

Returning to FIG. 3, candidate text area(s) 272 are input from horizontal alignment module 222 to shape suppression module 224, which filters out non-text related edges. Shape suppression module 224 uses a VQ-based shape classifier 226 to identify the text-related edges (classifier 226 is discussed in more detail below), resulting in a classification of each edge as being either text or non-text. After the classification, shape suppression module 224 removes any non-text related edges from each candidate text area, and adjusts the left and right sides of the area to the nearest text related edges. Shape suppression module 224 then compares the edge density of the areas of the vertical thinned edge that correspond to the adjusted candidate text areas to a threshold. Only those areas that have an edge density exceeding the threshold are output as one of the output text area(s) 320. Areas which have an edge density that does not exceed the threshold are dropped (that is, removed from being candidate text areas). In one implementation, this threshold value is set as ⅛ (e.g., more than one eighth of the pixels in the area need to be vertical edges). The output text area(s) 320 can be identified in any of a variety of manners, such as by identifying pixels (e.g., a list of pixels, two cater-corner pixels of a rectangle, etc.).

Figure 12:
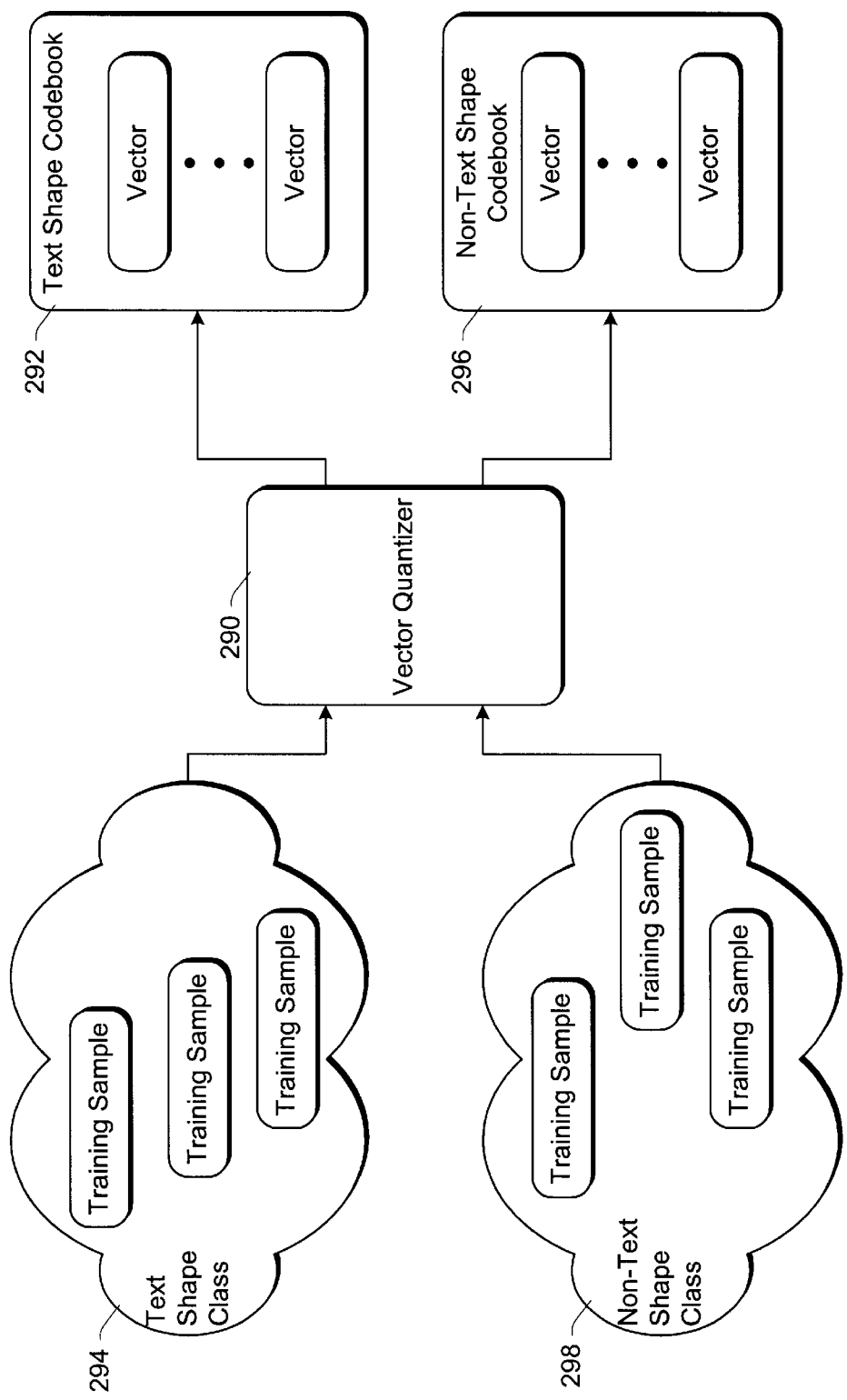
FIG. 12 illustrates an exemplary Vector Quantization (VQ) codebook generation process.

Classifier 226 is a VQ-based shape classifier. Classifier 226 relies on codebook vectors maintained in one or more VQ codebooks 227. FIG. 12 illustrates an exemplary codebook generation process. A vector quantizer 290 generates a text shape codebook 292 based on a text shape class 294, and also a non-text shape codebook 296 based on a non-text shape class 298. Vector quantizer 290 uses the multiple training samples within a class (e.g., text shape and non-text shape) to generate a corresponding codebook for that class. Each codebook includes one or more vectors (typically less than the number of training samples) which represent the training samples. Vector quantizer 290 operates in a conventional manner to obtain a set of vectors that best approximates the training samples.

Considering n training samples from a class c, a conventional vector quantizer 290 is used to extract m (m<n) codebook vectors $v_i$ ($1 \leq i \leq m$), from the n training samples. Given class c, the class-conditional density of a feature vector x, (that is, fx (x|c)) can be approximated by a mixture of Gaussians with identity covariance matrices, each centered at a codebook vector, such as the following:

$$f_X(x|c) \propto \sum_{i=1}^{m} w_i * \exp(-\|x - v_i\|^2 / 2) \quad (1)$$

where m is the number of codebook vectors in the class c, $v_i$ are the codebook vectors, and $w_i$ is the proportion of training samples assigned to $v_i$. A Bayesian classifier (classifier 226 of FIG. 3) is then defined using the maximum a posteriori criterion as follows:

$$\hat{c} = \underset{c \in \Omega}{\text{argmax}} \{p(c|x)\} = \underset{c \in \Omega}{\text{argmax}} \{p(x|c)p(c)\} \quad (2)$$

where $\Omega = \{c_1, c_2\}$ is the set of shape classes ($c_1$ representing the text shape class and $c_2$ the non-text shape class) and p(c) represents the priori class probability. Each consecutive edge (that is, each set of consecutive edge pixels) within the candidate text areas is classified (based on their corresponding feature vectors) into the highest probability class.

In one implementation, each consecutive thin edge in a vertical edge map is a training sample for training the codebook. The vertical edge map is generated from an image of text shapes (with little or no textured background) for the text shape class 294, and from an image of non-text shapes (with few or no text shapes) for the text shape class 298. Each feature vector consists of four elements:

$$v = (N/H, D/H, V_N/H, H_N/H)^T \quad (3)$$

where H is the pixel height of the candidate region; N is the number of pixels in the sample; D is the height of the center of gravity of the consecutive thin edge according to the bottom of the candidate region; and $V_N$ and $H_N$ are the numbers of pixels in the sample's vertical projection (the height of the sample in pixels) and horizontal projection (the width of the sample in pixels), respectively.

Training samples of class c, are from the vertical edge map of all the characters, both upper and lower cases, and digitals that may be included in text. Training samples of class $c_2$ consists of two parts. One part is from the real data selected manually (e.g., samples that are manually selected by a developer (or other user) as being non-text shapes). The other part is from a "bootstrap", that is, non-text samples that were previously incorrectly classified as text shapes. The codebook size for each training set is empirically set to 4.

FIG. 13 shows an example of the feature selection. FIG. 13(a) shows the image of a capital letter "A", while FIG. 13(b) shows a vertical edge map of the letter. FIG. 13(c) gives an example of the feature selection of one of the vertical edges. Given a candidate region, the height (H) of the candidate region is known. Respectively, $V_N$ and $H_N$ represent the number of pixels in the sample's vertical and horizontal projection in the illustrated example. D represents the distance between the center of gravity of the sample edge to the bottom of the candidate region. In this example the bottom of the sample edge equals the bottom of the candidate region. The number of pixels in the sample (N) can be readily calculated by counting the number of pixels in the vertical edge illustrated in FIG. 13(c).

Figure 14:
FIG. 14 illustrates output text areas in the video image of FIG. 5.

FIG. 14 illustrates the final text areas in an exemplary video frame 228 (e.g., the output of shape suppression module 224 based on candidate text areas 272 of FIG. 11).

Figure 15:
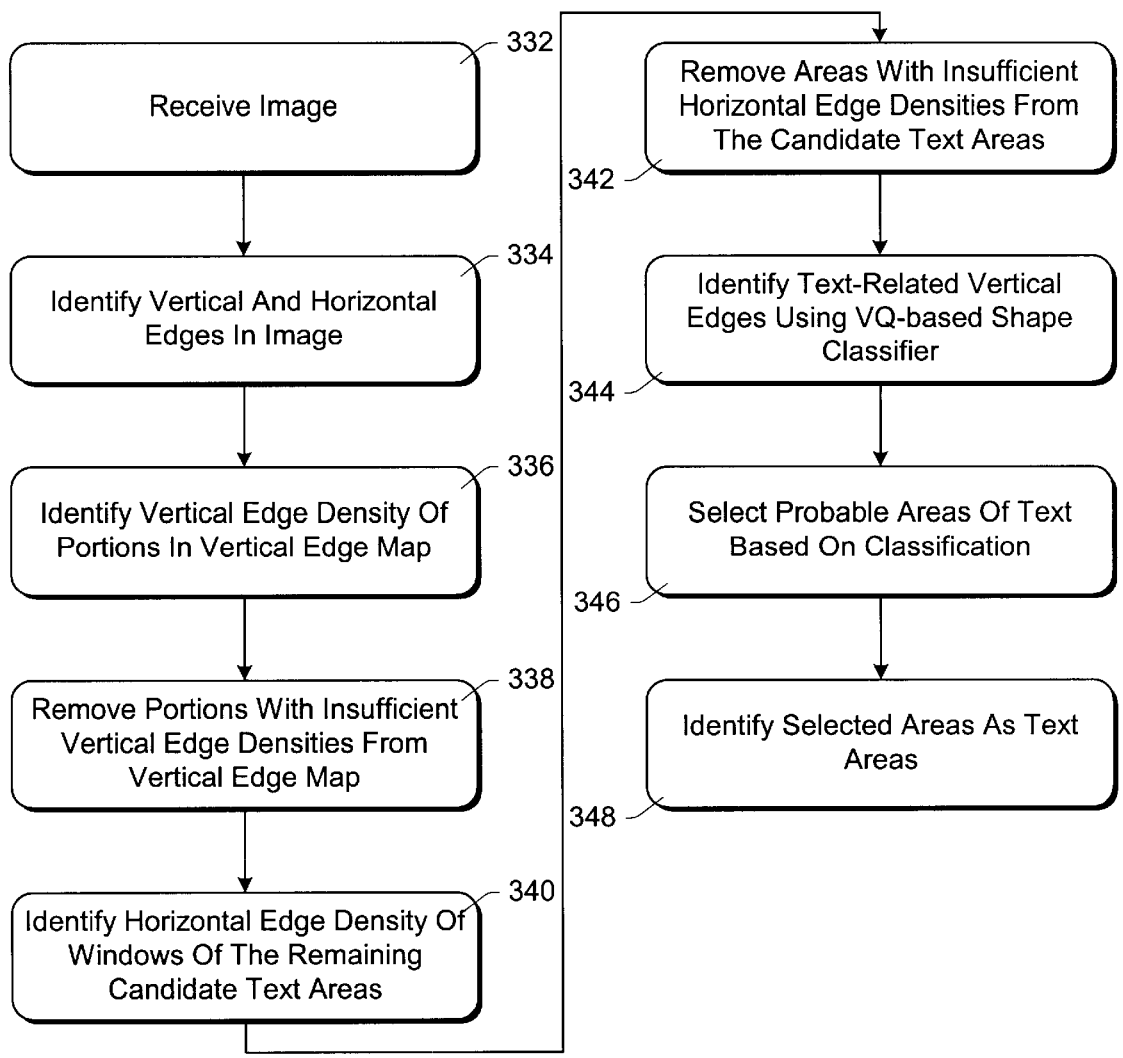
FIG. 15 is a flowchart illustrating an exemplary process for identifying text areas in accordance with certain embodiments of the invention.

FIG. 15 is a flowchart illustrating an exemplary process for identifying text areas in accordance with certain embodiments of the invention. The process of FIG. 15 is implemented by text area detection system 210 of FIG. 3, and may be performed in software. FIG. 15 is described with additional reference to components in FIG. 3.

A video image 228 is received by system 210 (block 332). Vertical and horizontal edges in the image are identified (block 334), and the vertical edge density of portions in the vertical edge map is identified (block 336). Portions with insufficient vertical edge densities are then removed from the vertical edge map (block 338). The horizontal edge densities of verification windows of the remaining candidate text areas are then identified (block 340), and any areas with insufficient horizontal edge densities are removed from the candidate text areas (block 342). After that, text-related vertical edges in the candidate areas are identify by a VQ-based shape classifier (block 344). Based on this classification, probable areas of text are selected (block 346). The selected areas are then identified as text areas (block 348)

In the discussions herein, the shape suppression is performed based on the vertical characteristics of the video image and the vertical characteristics of characters in the language being detected. Alternatively, different characteristics may be used, depending on the language itself or the manner in which the language is likely to be presented. For example, characters of a language may be presented vertically rather than horizontally, in which case the horizontal characteristics rather than the vertical characteristics may be used for the shape suppression. By way of another example, other characteristics of characters of a particular language may be more relevant than the vertical characteristics, such as the horizontal characteristics or the diagonal characteristics (either sloping down from left to right or sloping up from left to right).

Conclusion

Thus, using shape suppression to identify areas of images that include particular shapes (e.g., text) has been described. The shape suppression advantageously compares edges in the images to characteristics of the shapes to be identified by VQ-based shape classifier. The results of such comparisons are used to filter out edges that do not correspond to the particular shapes. Additional processing steps are used to further refine which edges are edges of particular shapes rather than other objects, and the areas of the image including such shapes are identified.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A system to identify areas of text in a video image, the system comprising:
   a segmentation module to,
   receive a vertical edge map of the video image,
   determine the edge density of a plurality of portions of the vertical edge map,
   identify, based on the edge densities, one or more candidate text areas of the video image that may contain text;
   a shape classifier, coupled to the segmentation module, to recognize a plurality of shapes that may occur in the text; and
   a shape suppression module, coupled to the shape classifier, to,
   receive the one or more candidate text areas,
   remove, from the one or more candidate text areas, vertical edges that are not recognized as text shapes by the shape classifier, and
   remove an area from the one or more candidate text areas if the area has a low edge density.

2. A system as recited in claim 1, wherein the shape suppression module is further to reduce the size of an area of the one or more areas by excluding from the area portions at one or more of opposite ends of the area in which vertical edges have been removed.

3. A system as recited in claim 1, wherein the segmentation module is to identify a candidate text area by:
   identifying one of the plurality of portions having an edge density that exceeds a threshold value; and
   repeatedly increasing the size of the portion by an additional amount as long as the edge density exceeds the threshold value.

4. A system as recited in claim 3, wherein the segmentation module is further to identify the candidate text area by repeatedly decreasing the size of the portion by an amount less than the additional amount as long as the edge density of the amount does not exceed the threshold value.

5. A system as recited in claim 1, wherein the segmentation module is further to output a selected edge map which includes only edges in the identified one or more candidate text areas.

6. A system as recited in claim 1, wherein the system further includes a differential module to receive the video image and to use a differential filter to identify the vertical edges in the video image.

7. A system as recited in claim 6, wherein the differential filter comprises one of: a Sobel filter, a Prewitt filter, or a Kirsch filter.

8. A system as recited in claim 6, wherein the system further includes a thinning module coupled to receive the identified vertical edges from the differential module and apply a non-maxima suppression filter to the identified vertical edges to generate a vertical edge map and output the vertical edge map to the segmentation module.

9. A system as recited in claim 1, wherein the segmentation module is further to count a number of edges in each of the plurality of portions of the vertical edge map to determine the edge density of that portion.

10. A system as recited in claim 1, wherein the segmentation module is further to adjust the size of an identified area by analyzing portions of the identified area and leaving the portion as part of the identified area if the number of vertical edges in the portion exceeds a first threshold, and removing the portion from the identified area if the number of vertical edges in the portion does not exceed the first threshold.

11. A system as recited in claim 1, wherein the system further includes a differential module to receive the video image and to use a differential filter to identify horizontal edges in the video image.

12. A system as recited in claim 11, wherein the differential filter comprises one of: a Sobel filter, a Prewitt filter, or a Kirsch filter.

13. A system as recited in claim 11, wherein the system further includes a thinning module coupled to receive the identified horizontal edges from the differential module and apply a non-maxima suppression filter to the identified horizontal edges to generate a horizontal edge map.

14. A system as recited in claim 13, wherein the system further includes:
   a horizontal alignment module to receive the candidate text areas from the segmentation module, and to determine, for each of the areas, whether the area is to remain a candidate text area based at least in part on the horizontal edge map.

15. A system as recited in claim 14, wherein the horizontal alignment module is further to output each of the candidate text areas to the shape suppression module.

16. A system as recited in claim 14, wherein the horizontal alignment module is further to analyze, for each of the candidate text areas, an upper portion and a lower portion of the area, and to keep the area as a candidate text area if a number of horizontal edges in the upper portion exceeds a threshold and if the number of horizontal edges in the lower portion exceeds the threshold, otherwise to not include the area as a candidate text area.

17. A system as recited in claim 16, wherein the width of each of the upper and lower portions for an identified area is the width of the candidate text area, and wherein the height of each of the upper and lower portions is three pixels.

18. A system as recited in claim 17, wherein the threshold is equal to one-tenth of the total number of pixels in the upper portion.

19. A system as recited in claim 1, wherein the shape classifier comprises a Vector Quantization (VQ)-based Bayesian classifier.

20. A system as recited in claim 1, wherein the shape classifier is to recognize shapes as text shapes by comparing characteristics of edges in the candidate text areas to characteristics of the plurality of shapes.

21. A method comprising:
receiving an image;
identifying edges in the image;
identifying, based on the identified edges, candidate text areas which may contain shapes; and
removing, from the candidate text areas, edges which are not recognized as characteristic of one or more shapes.

22. A method as recited in claim 21, wherein the identifying edges comprises identifying both horizontal edges and vertical edges in the image.

23. A method as recited in claim 21, wherein the identifying candidate text areas further comprises:
determining an edge density of portions of a vertical edge map including at least some of the identified edges;
identifying, based on the edge densities of the portions, one or more areas of the image which may contain shapes; and
using a horizontal edge map including other of the identified edges to both verify and adjust the identified areas.

24. A method as recited in claim 21, further comprising removing a candidate text area with a low edge density from being a candidate text area.

25. A method as recited in claim 21, wherein the shapes comprise one or more of: letters, numbers, symbols, punctuation marks, and ideograms.

26. A method as recited in claim 21, wherein the one or more shapes include English language alphanumerics and punctuation.

27. A method as recited in claim 21, wherein the image comprises a video frame.

28. A method as recited in claim 21, wherein the removing is performed based on whether edges are recognized as being characteristic of a shape by a Vector Quantization (VQ)-based Bayesian classifier.

29. A method as recited in claim 21, wherein the identifying edges comprises:
using a differential filter to generate a vertical edge map identifying vertical edge locations in the image; and
using a non-maxima suppression filter to generate a thinned edge map identifying the vertical edges in the image.

30. A method as recited in claim 21, wherein the identifying edges comprises using a Sobel filter to generate a vertical edge map identifying vertical edge locations in the image.

31. A method as recited in claim 23, wherein the determining an edge density for a portion comprises:
dividing a number of pixels in the portion which represent edges by the total number of pixels in the portion.

32. A method as recited in claim 21, wherein the identifying edges in the image comprises:
using a differential filter to generate a horizontal edge map identifying horizontal edge locations in the image; and
using a non-maxima suppression filter to generate a thinned edge map identifying the vertical edges in the image.

33. A method as recited in claim 21, wherein the identifying edges comprises using a Sobel filter to generate a horizontal edge map identifying horizontal edge locations in the image.

34. One or more computer-readable memories containing a computer program that is executable by a processor to perform the method recited in claim 21.

35. A method of identifying areas in a video image that include characters, the method comprising:
receiving an edge map identifying edges in the video image;
identifying, based on the edge map, candidate text areas which may include characters; and
removing, from the candidate text areas, edges which are not recognized as characteristic of one or more characters.

36. A method as recited in claim 35, wherein the identifying candidate text areas further comprises:
determining an edge density of portions of a vertical edge map including at least some of the identified edges;
identifying, based on the edge densities of the portions, one or more areas of the image which may contain characters; and
using a horizontal edge map including other of the identified edges to both verify and adjust the identified areas.

37. A method as recited in claim 35, further comprising removing a candidate text area with a low edge density from being a candidate text area.

38. A method as recited in claim 35, wherein the removing is performed based on whether edges are recognized as being characteristic of a shape by a Vector Quantization (VQ)-based Bayesian classifier.

39. One or more computer-readable media having stored thereon a computer program to identify areas in a video image that include symbols, wherein the computer program, when executed by one or more processors, causes the one or more processors to perform acts including:
identifying a plurality of vertical edges in the video image;
generating a vertical thinned edge map based on the plurality of vertical edges;
identifying a plurality of horizontal edges in the video image;
generating a horizontal thinned edge map based on the plurality of horizontal edges;
determining an edge density of portions of the vertical thinned edge map;
identifying, as candidate text areas, portions of the vertical thinned edge map having an edge density exceeding a first threshold value;
determining a horizontal edge density of portions of the horizontal thinned edge map;
removing, from the identified candidate text areas, each area having a horizontal edge density in an upper portion and a lower portion that is lower than a second threshold value;

adjusting the upper and lower boundaries of each remaining candidate text area based on the horizontal edges in the upper portion and lower portion of the area;

removing, from each of the remaining candidate text areas, vertical edges which are not recognized as characteristic of shapes;

removing areas from the remaining candidate text areas having an edge density less than a third threshold value; and outputting any remaining candidate text areas as a set of one or more text areas.

40. One or more computer-readable media as recited in claim 39, wherein the identifying a plurality of vertical edges comprises using a differential filter to identify the plurality of vertical edges.

41. One or more computer-readable media as recited in claim 40, wherein the using a differential filter comprises using one of: a Sobel filter, a Prewitt filter, or a Kirsch filter.

42. One or more computer-readable media as recited in claim 39, wherein the generating a vertical thinned edge map comprises using a non-maxima suppression filter to generate the vertical thinned edge map.

43. One or more computer-readable media as recited in claim 39, wherein the identifying a plurality of horizontal edges comprises using a differential filter to identify the plurality of horizontal edges.

44. One or more computer-readable media as recited in claim 43, wherein the using a differential filter comprises using a Sobel filter or a Prewitt filter or a Kirsch filter.

45. One or more computer-readable media as recited in claim 39, wherein the generating a horizontal thinned edge map comprises using a non-maxima suppression filter to generate the horizontal thinned edge map.

46. One or more computer-readable media as recited in claim 39, wherein the removing vertical edges is based on classification performed by a Vector Quantization (VQ)-based Bayesian classifier.

47. One or more computer-readable media as recited in claim 39, wherein the computer program, when executed, further causes the one or more processors to recognize whether an edge is characteristic of a shape by comparing the edge to approximations of a plurality of known shapes.

48. A method comprising:

receiving an identification of edges in a video image;

comparing the edges to a plurality of known shapes; and outputting an identification of edges which are recognized as matching one of the plurality of known shapes, further comprising identifying, as areas of text, areas of the video image including the edges which are recognized as matching one of the plurality of known shapes.

49. A method as recited in claim 48, wherein the edges comprise vertical edges.

50. A method as recited in claim 48, wherein the method is implemented by a Vector Quantization (VQ)-based Bayesian classifier.

51. One or more computer-readable memories containing a computer program that is executable by a processor to perform the method recited in claim 48.

52. One or more computer-readable memories containing a computer program that is executable by a processor to perform acts of:

identifying edges in a video image;

identifying, as candidate areas of text, areas of a video image including the edges which are recognized as matching one of a plurality of known shapes; and removing, from the candidate text areas, edges which are not recognized as characteristic of one or more of the plurality of known shapes.

53. One or more computer-readable memories as recited in claim 52, wherein the computer program is executable by a processor to further perform acts of:

identifying, based on the identified edges, candidate text areas which may contain one or more of the plurality of known shapes.

54. One or more computer-readable memories as recited in claim 52, wherein the computer program is executable by a processor to further perform acts of:

identifying, based on the identified edges, candidate text areas which may contain one or more of the plurality of known shapes, wherein identifying edges comprises identifying both horizontal edges and vertical edges in the image.

55. One or more computer-readable memories as recited in claim 52, wherein the computer program is executable by a processor to further perform acts of:

determining an edge density of portions of a vertical edge map including at least some of the identified edges;

identifying, based on the edge densities of the portions, one or more areas of the image which may contain one or more of the plurality of known shapes; and using a horizontal edge map including other of the identified edges to both verify and adjust the identified areas.

56. One or more computer-readable memories as recited in claim 52, wherein the computer program is executable by a processor to further perform acts of removing a candidate text area with a low edge density from being a candidate text area.

57. One or more computer-readable memories as recited in claim 52, wherein the computer program is executable by a processor to further perform acts of identifying, based on the identified edges, candidate text areas which may contain shapes comprising one or more of: letters, numbers, symbols, punctuation marks, and ideograms.

58. One or more computer-readable memories as recited in claim 52, wherein the computer program is executable by a processor to further perform acts of identifying, based on the identified edges, candidate text areas which may contain shapes comprising English language alphanumerics and punctuation.

59. One or more computer-readable memories as recited in claim 52, wherein the removing is performed based on whether edges are recognized as being characteristic of a shape by a Vector Quantization (VQ)-based Bayesian classifier.

60. One or more computer-readable memories as recited in claim 52, wherein the computer program is executable by a processor to further perform acts of:

identifying, based on the identified edges, candidate text areas using a differential filter to generate a vertical edge map identifying vertical edge locations in the image; and using a non-maxima suppression filter to generate a thinned edge map identifying the vertical edges in the image.

61. One or more computer-readable memories as recited in claim 52, wherein the computer program is executable by a processor to further perform acts of:

identifying, based on the identified edges, candidate text areas using a Sobel filter to generate a vertical edge map identifying vertical edge locations in the image.

* * * * *